(12) United States Patent
Tanabe

(10) Patent No.: US 7,581,049 B2
(45) Date of Patent: Aug. 25, 2009

(54) BUS CONTROLLER

(75) Inventor: Yuzuru Tanabe, Saitama Pref. (JP)

(73) Assignee: Texas Instruments Incorporated, Dallas, TX (US)

( * ) Notice: Subject to any disclaimer, the term of this patent is extended or adjusted under 35 U.S.C. 154(b) by 9 days.

(21) Appl. No.: 11/257,176

(22) Filed: Oct. 24, 2005

(65) Prior Publication Data

US 2006/0090024 A1 Apr. 27, 2006

(30) Foreign Application Priority Data

Oct. 27, 2004 (JP) .............................. 2004-312310

(51) Int. Cl.
*G06F 13/00* (2006.01)

(52) U.S. Cl. ........................ 710/110; 710/305; 710/306; 710/240

(58) Field of Classification Search ................ 710/110, 710/100, 105–106, 305–306, 116, 311, 240–244, 710/316–317; 370/465
See application file for complete search history.

(56) References Cited

U.S. PATENT DOCUMENTS

| | | | |
|---|---|---|---|
| 5,862,356 A * | 1/1999 | Normoyle et al. ........... 710/116 |
| 5,978,879 A * | 11/1999 | Harumoto et al. ........... 710/311 |
| 6,275,890 B1 | 8/2001 | Lee et al. |
| 6,587,905 B1 | 7/2003 | Correale, Jr. et al. |
| 6,788,703 B2 * | 9/2004 | Tran ........................... 370/465 |
| 6,950,408 B1 * | 9/2005 | Domon et al. ............. 370/257 |
| 7,000,059 B2 * | 2/2006 | Liu ............................. 710/309 |
| 7,117,277 B2 * | 10/2006 | Mathewson et al. ........... 710/58 |
| 2002/0032796 A1 * | 3/2002 | Van Loo ..................... 709/235 |
| 2003/0145144 A1 | 7/2003 | Hofmann et al. |
| 2004/0088469 A1 | 5/2004 | Levy |
| 2005/0027920 A1 | 2/2005 | Fitzsimmons et al. |

OTHER PUBLICATIONS

David Mayhew and Venkata Krishnan: "PCI Express and Advanced Switching: Evolutionary Path to Building Next Generation Interconnects," Proceedings of the 11th Symposium on High Performance Interconnects, Aug. 20-22, 2003, Piscataway, NJ, USA, IEEE, Aug. 20, 2003, pp. 21-29.

* cited by examiner

*Primary Examiner*—Mark Rinehart
*Assistant Examiner*—Kim T Huynh
(74) *Attorney, Agent, or Firm*—Robert D. Marshall, Jr.; Wade J. Brady, III; Frederick J. Telecky, Jr.

(57) ABSTRACT

A single bus apparatus enables the simultaneous execution of both high-speed data transfer, which requires real time operation, and low-speed data transfer. At least one of slaves I/F 22-0, 22-1, . . . that control slave devices SV0-SV3 upon the request from master devices MS0-MS3 connected to interconnection bus BS via master I/Fs 21-0 through 21-3 has a constitution made of multiport slave I/F 23 corresponding to a multi-access function that allows simultaneous access from plural master devices MS0-MS3.

6 Claims, 9 Drawing Sheets

| | For sDRAM Direction | Clock Rate (MHz) | Data Width (Bytes) | Transfer Rate (M-Bytes/S) | Transfer Rate (M-bits/S) |
|---|---|---|---|---|---|
| CCD Input | In | 30 | 2 | 60 | 480 |
| Image Process | Out | | | 60 | 480 |
| Image Process | In | | | 27 | 216 |
| NTSC Output | Out | 13.5 | 2 | 27 | 216 |
| Coding For DV | Out | | | 27 | 216 |
| Coding For DV | In | | | 3.75 | 30 |
| Save Date to Tape | Out | | | 3.75 | 30 |
| Total Master Access | | | | 208.5 | 1,668 |
| Hi-speed Memory | | 108 | 2 | 216 | 1,728 |
| Remain | | | | 7.5 | 60 |

BUS CONTROLLER

CROSS REFERENCE TO RELATED APPLICATIONS

This application claims priority under 35 USC § 119 of Japanese Application Serial No. 2004-312310, filed Oct. 27, 2004.

FIELD OF THE INVENTION

The present invention pertains to a type of bus controller characterized by the fact that access from master devices to slave devices is controlled by means of master interfaces connected between the master devices and the bus and slave interfaces connected between the slave devices and the bus.

BACKGROUND OF THE INVENTION

FIG. 10 is a diagram illustrating the bus constitution adopted in the prior art in a system that requests real time operation for data input/output.

As shown in FIG. 10, system 100 is roughly divided into high-speed transfer part 101 that requires real time operation, and control processing part 102 that executes various controls and treatments by means of CPU control parallel to said high-speed transfer. If the real time operation requirement cannot be met because the output speed of data is lower than the input speed of data for the overall system at the data quantity (data transfer bandwidth) that can be transferred in unit time of the bus (known as CPU bus or system bus) owned by control processing part 102, high-speed transfer part 101 that allows real time data transfer works to meet the demand.

In said high-speed transfer part 101, input interface 102, burst data traffic control part 103, and output interface 104 are inserted in data high-speed transfer path (real time data bus) 105. High-speed memory 106 is connected to burst data traffic control part 103, and, under its control, high-speed data input/output can be performed via the input/output ports with a large bandwidth. Said burst data traffic control part 103 is connected to data processor 107 in control processing part 102, and, by means of this part, it is possible to fetch the data directly without going through CPU 109. Said data processor 107 performs the necessary treatment for the data read from high-speed memory 106 without degrading the real time property, and it outputs the processed data to burst data traffic control part 103.

In addition to high-speed treatment for image data, etc., performed by data processor 107, control processing part 102 mainly performs treatment of the control system, and it has CPU 109 and DMA (Direct Memory Access) control part 110 as the master devices connected to CPU bus 108. Said control processing part 102 has (low-speed) memory 111 and various peripheral devices (peripherals 0-3) 112 as slave devices connected to CPU 108.

For a system that processes images, as explained above, it is necessary to meet the requirement of real time data transfer when data are continuously input and data are continuously output at the same speed. However, when a high-speed bus constitution extending to the treatment of the system control unit is formed, all the master devices and slave devices connected to the bus are required to have a high-speed treatment ability, so the system becomes very expensive. Also, in the constitution of the CPU bus only, when the CPU bus is used by a master device (CPU 109, DMA control part 110, etc.), it cannot be used by other master devices (such as data processor 107). Consequently, this phenomenon hampers the treatment of the high-speed transferred data. As a result, as shown in FIG. 10, bus (CPU bus) 108 of the system control unit is formed with the necessary data transfer bandwidth, and high-speed transfer part 101 having real time data bus 105 with a data transfer bandwidth larger than said necessary data transfer bandwidth is set separately.

A problem of this bus constitution is that it is impossible to easily change the transfer path of data in two transfer systems. That is, when transfer is necessary between the two transfer systems via a CPU bus with a small data transfer bandwidth, the bus constitution should be redesigned from the initial bus constitution, or it may be necessary to have a special I/F bus that does not go through CPU bus 108 upon the request of the system as shown in the Figure. In the example of constitution shown in FIG. 10, specific I/F buses 113A, 113B, 113C, 113D are connected between CPU 109, memory 111, a peripheral device (Peripheral 0), a peripheral device (Peripheral 1) and burst data traffic control part 103.

In this case, for the slave devices using the data in the high-speed memory via the specific I/F bus, that is, memory 111, a peripheral device (Peripheral 0) or a peripheral device (Peripheral 1), a DMA function is necessary, and the structure of each slave device is complicated.

Also, change of the clock is necessary between said slave devices and high-speed transfer part 101 that handles data at a high speed, so the structure is complicated.

In addition, by adding the functions of the slave devices that meet said requirement, the logic is increased, and the device size increases.

As explained above, each time the system is changed, it is necessary to reconstruct the bus, it is impossible to reuse the two transfer system blocks, and the overall constitution is complicated each time the system is changed.

Although this problem does not directly cause problems in function, its development nevertheless requires significant resources, that is, many man-hours are required for specifications determination, design, simulation, and evaluation. Also, the overall system is prone to becoming complicated. As a result, problems are caused and a risk for requirement of redesign may occur. Also, realization of a low price becomes harder.

On the other hand, as a structure that allows easy adjustment of the number of master devices and slave devices and easy change of the type, an interconnection bus constitution exists (also known as multi-layer or central resource constitution).

FIG. 11 is a simplified diagram illustrating the constitution of a system that adopts the interconnection bus constitution. In FIG. 11, only the data flow is shown, while the control signals are not shown.

As shown in FIG. 11, system 200 has interconnection bus controller 201 (interconnect bus controller), four master devices MS0-MS3 connected to interconnection bus controller 201, and four slave devices SV0-SV3 connected to interconnection bus controller 201.

The interconnection bus controller 201 has interconnection bus BS, and four master interfaces (to be referred to hereinafter as master I/F) 21-0 through 21-3 connected for interconnection to bus BS to the side of the master devices. Also, four slave interfaces (to be referred to hereinafter as slave I/F) 22-0 through 22-3 are connected to the slave device side of interconnection bus BS. The master I/Fs 21-0 through 21-3 are each connected to one master device, and control the flow of data and control signals with respect to the master device. Similarly, slave I/Fs 22-0 through 22-3 are each connected to one corresponding slave device, and control the flow of the data and control signals with respect to the slave device. For the master I/Fs 21-0 through 21-3 as shown in FIG. 11, data are input from different slave devices, and selector 211 selects and outputs one of them. Also, slave I/Fs 22-0 through 22-3 have data input from different master devices, and selector 221 selects and outputs one of them.

In interconnection bus BS, each master I/F and slave I/F has an independent bus for transmission, and sends a data signal with respect to its unique bus for transmission. Also, each master I/F and slave I/F is connected to the transmission bus of all the other slave I/Fs and master I/Fs, and a data signal is received from the one transmission bus selected by the selector.

In the following, an explanation will be presented in detail regarding an example of operation in which a data signal is transmitted from a master device to a slave device upon request from the master device.

At first, master devices MS0-MS3 send the address (ADRS) that specifies the slave device for data transmission to the corresponding master I/Fs. Said master I/Fs 21-0 through 21-3 decode the address sent from the corresponding master devices, and output the access request (request signal) to a slave I/F. This request signal is transmitted to the slave I/F via interconnection bus BS.

When slave I/Fs 22-0 through 22-3 receive several signals from master I/Fs, one master I/F is specified according to the priority order allotted to the master devices, and only the grant signal is sent to said master I/F. If there is one request signal, the slave I/F sends the master I/F grant signal of the transmitting source of the request signal.

On the other hand, if a grant signal does not come from the slave I/F that requests access, master I/Fs 21-0 through 21-3 output a standby signal to the connected master device. When a grant signal is received from the slave I/F that requires access, the master I/F outputs the grant signal to the master device. The master device that receives the grant signal outputs the prescribed data signal via the master I/F.

For slave I/Fs 22-0 through 22-3, from several input signals, the data signal from the granted master device is selected by selector 221, and it is output to the connected slave device.

As explained above, a data signal is sent from the master device to the slave device. In the reverse case, slave I/Fs 22-0 through 22-3 output a data signal from the connected slave device, and selector 211 in master I/F selects the data signal from the slave device that requests access, and outputs it to the connected master device.

In the aforementioned interconnection bus constitution, when a slave device is to be added, an unused address is allotted to the slave device, and said slave device is simply connected to an unused (or newly added) slave I/F. Consequently, in this system using an interconnection bus, it is easy to change the system constitution without changing the interconnection bus constitution itself. This is an advantage.

However, in the interconnection constitution, the transfer ability of all the master and slave parts depends on the data transfer bandwidth and operation frequency of the bus. Consequently, in a system that requires a real time property, it is necessary to increase the data transfer ability of the bus itself to meet the demand for the real time data transfer. However, when such high data transfer ability is equipped, the price of the bus constitution rises, and the operation frequency rises, so the operation is likely to be unstable. In addition, such a high data transfer ability becomes useless overhead for the other slave devices that do not require real time operation. In some cases, it is also necessary to change the clock.

In addition, there are other problems in the interconnection bus constitution. As one such problem, one slave device is used for one master device. In this case, the other master devices cannot access said slave device. That is, when a master device having high priority uses a certain slave device, the other master devices with a lower priority may be unable to access the slave device.

SUMMARY OF THE INVENTION

The objective of this invention is to solve the aforementioned problems of conventional methods by providing a system that can simultaneously execute high-speed data transfer, which requires real time operation, and low-speed data transfer with a single bus constitution, and that allows easy change of the system.

The present invention provides a type of bus controller characterized by the following facts: the bus controller has a prescribed number of master interfaces that each allow connection of a master device, a prescribed number of slave interfaces that each allow connection of a slave device, and a bus that connects said master interfaces and slave interfaces; as a response to access from the master devices, by means of the master interfaces and slave interfaces, communication via the bus of the master devices and slave devices is controlled; in this bus controller, at least one of said slave interfaces is a slave interface corresponding to a multi-access that allows simultaneous access from plural master devices.

The slave interface corresponding to a multi-access preferably has N interface parts set between the bus side and slave device side, and it preferably has a constitution that allows simultaneous access from up to N master devices. In this case, the following scheme is even more preferred: it has a slave connecting part, which is set between said N interface parts and a slave device, which divides the signal from said slave device into N signals that are output to said N interface parts, and which merges the N signals input from said N interface parts to a single signal for output to said slave device, and converts the transfer speed of said bus and the transfer speed of said slave device.

According to this invention, the following scheme is preferred: plural addresses are allotted to the slave device connected to said slave interface corresponding to the multi-access, an address is allotted to each of the other slave devices, and said slave interface corresponding to the multi-access uses the allotted plural addresses to control signal input/output corresponding to the priority order of the master devices that request access.

REFERENCE NUMERALS AND SYMBOLS AS SHOWN IN THE DRAWINGS

In the figures, 1 represents the system, 2 an interconnection bus controller, 3 a high-speed slave connecting part, 21 a master I/F, 22 a slave I/F, 23 a multiport slave I/F, 31 a buffer I/F, 31A a buffer, 32 an arbiter & selector, 32A a selector, 211, 221, 231 selectors, 233 an I/F control part, 233A an access grant control part, MS0-MS5 master devices, SV0-SV7 slave devices, BS an interconnection bus, RS a request signal, GS a grant signal, Dm, Ds data signals, CSm a master control signal, CSs a slave control signal, ADRS an address signal, and Ps an interface part.

DETAILED DESCRIPTION OF THE DRAWINGS

For the bus controller of the present invention, at least one of plural slave interfaces is a slave interface corresponding to multi-access that allows simultaneous access from plural master devices. Consequently, it is possible to increase the data transfer quantity corresponding to the simultaneous access number, and it is possible to transfer data at an even higher speed. In this case, it is only necessary to change the constitution of the corresponding slave interface, and there is no need to change the bus constitution (that is, the data transfer bandwidth, operation frequency, etc.). Consequently, there is no need to change the clock.

As explained above, according to the present invention, when a high-speed slave device is added, there is no need to change the bus constitution, so it is easy to change the system. This is an advantage.

In the following, an explanation will be presented regarding a system that adopts an interconnection bus constitution as an embodiment of the present invention.

Figure 1:
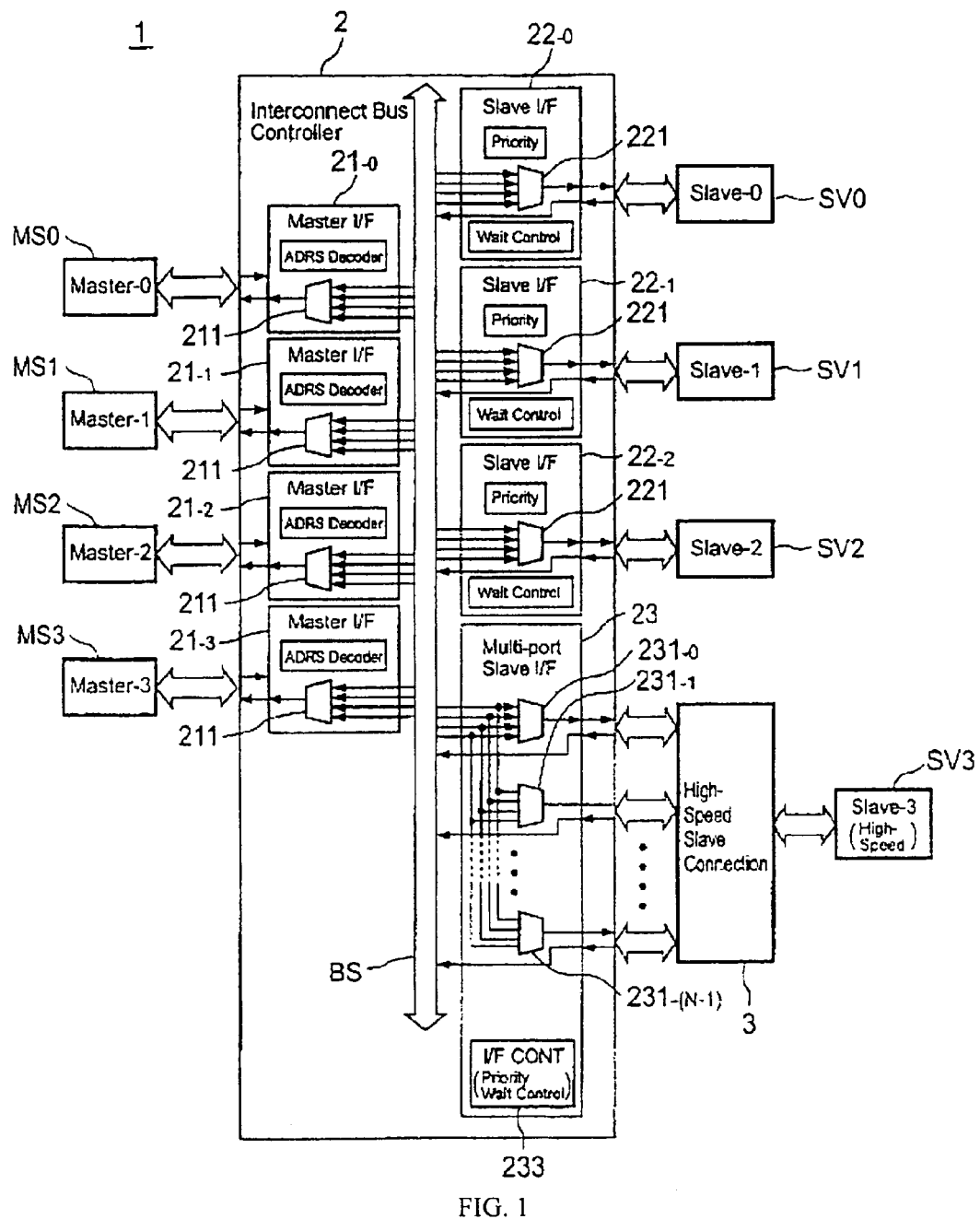
FIG. 1 is a schematic diagram illustrating the constitution of a system adopting an interconnection constitution in an embodiment of the present invention.

FIG. 1 is a schematic diagram illustrating the system that adopts the interconnection bus constitution of this embodiment. FIG. 1 shows only the flow of data, and the control signals are not shown. Here, the control signals will also be explained. The type of control signal and the specific procedure of control can be varied, and they are not limited to the following description.

As shown in FIG. 1, system 1 has interconnection bus controller 2 (Interconnect Bus Controller), four master devices MS0-MS3 connected to interconnection bus controller 2, and four slave devices SV0-SV3 connected to interconnection bus controller 2. Among them, at least one slave device (here, slave device SV3) is a high-speed slave device that operates at a higher speed than the other slave devices.

The interconnection bus controller 2 has interconnection bus BS, and four master interfaces 21-0 through 21-3 (to be referred to hereinafter as master I/F) are connected for interconnection to bus BS to the master device side. Also, four slave interfaces 22-0 through 22-2 and 23 (to be referred to hereinafter as slave I/F) are connected to the slave device side of interconnection bus BS. Said master I/Fs 21-0 through 21-3 are each connected to one corresponding master device, that is, one of master devices MS0-MS3, and they control the flow of data and control signals between them and the master devices. Similarly, slave I/Fs 22-0 through 22-2 and 23 are each connected to one slave device, that is, one of slave devices SV0-SV3, and they control the flow of data and control signals between them and the slave devices. As shown in FIG. 1, each master I/F 21-0 through 21-3 has selector 211 that takes the data from the different slave devices as input, and selects one of them for output.

Each of the slaves I/F 22-0 through 22-2 has selector 221 that takes the data from different master devices as input, and selects and outputs one of them. Also, in each slave I/F 22-0 through 22-2, the data signal from the slave device side is input to transmission interconnection bus BS without going through the selector.

In each master I/F, the data signal from the master device is input to transmission interconnection bus BS without going through the selector.

On the other hand, in this embodiment, newly set slave I/F 23 has plural (e.g., N) interface parts set on the side of interconnection bus BS and the slave device side.

The slave I/F 23 has N selectors 231-0, 231-1, ..., 231-(N−1) that can simultaneously select up to N data signals input from up to N different master devices and can output them to the slave devices via N different interface parts. More specifically, the four data signals input from interconnection bus BS to selector (231-0) are branched in the interior, and, in the other selectors 231-1, ..., 231-(N−1), too, wiring is performed on the bus side of each selector so that parallel input is realized. The outputs of said N selectors 231-0, 231-1, ..., 231-(N−1) become the N outputs on the slave device side.

Also, for slave I/F 23, the data signals from high-speed slave device SV3 are input from N interface parts, and these interface parts are connected independently to interconnection bus BS. As a result, the N interface parts in slave I/F 23 each act as an independent slave I/F in data transmission/reception.

The slave I/F 23 allows simultaneous access (multi-access) from up to N master devices with said constitution. Also, because there are N interface parts that can output up to N data signals to the side of high-speed slave device SV3 by means of multi-access, this interface is called a multiport slave I/F. Said multiport slave I/F 23 is a slave I/F from the viewpoint of the master device side and, from the viewpoint of interconnection bus BS, the function is the same as if N conventional (standard) slave I/Fs existed. This is an important feature since it facilitates change in design and expansion of the system without changing the constitution of interconnection bus BS.

In high-speed slave I/F 23, interface control part (I/F CONT) 233 is set for checking the priority of the master device for access, controlling N selectors 231-0, 231-1, ..., 231-(N−1), and controlling standby or grant of input/output of the data in the case of multi-access. Other slave I/Fs 22-0 through 22-2 also have a constitution for realizing nearly the same function. However, they are not shown in FIG. 1. Also, the access request from the master device assigns the address (ADRS) of the slave device, and, for this purpose, it has the function to decode the address for each of master I/Fs 21-0 through 21-3, and the function in controlling selector 211. However, this constitution is not shown in FIG. 1.

Figure 2:
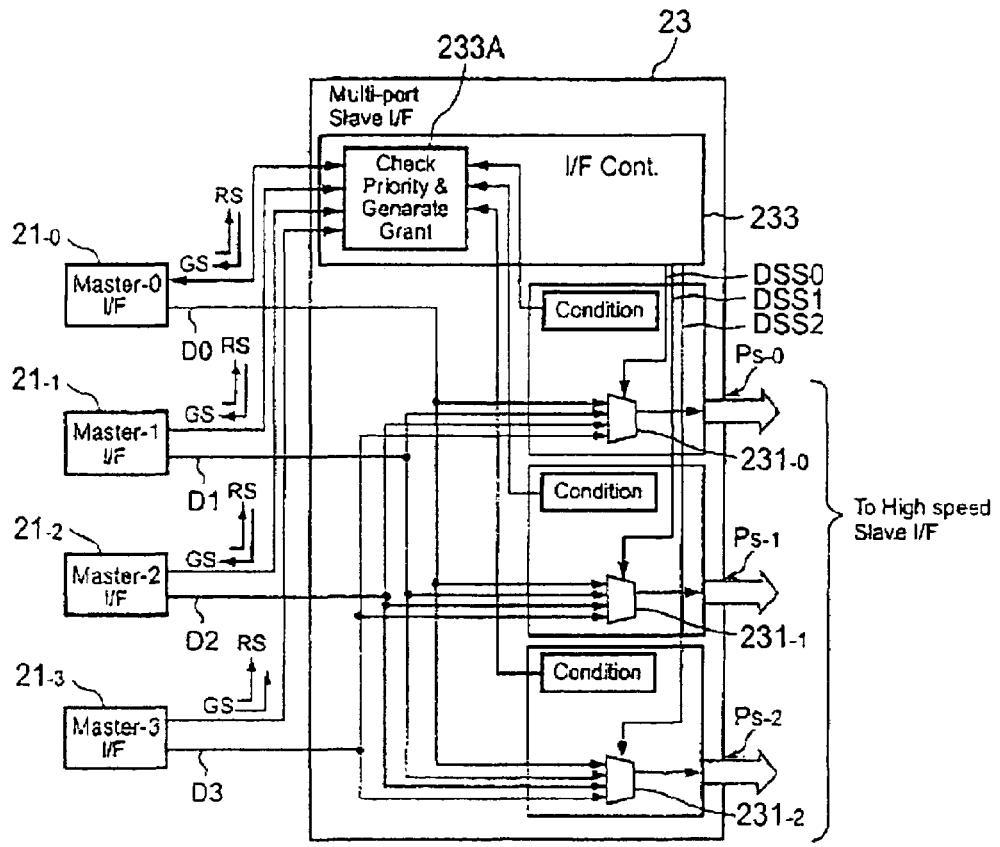
FIG. 2 is a diagram illustrating the constitution of the multiport slave I/F showing the path of the signals in receiving the access request and granting of access.

FIG. 2 is a diagram illustrating the constitution of multiport slave I/F 23 in detail to show the path of a signal that receives an access request from the master I/F and that grants access.

Also, in this case, interconnection bus BS is omitted from the Figure, and number (N) of interface parts of multiport slave I/F 23 is shown here as 3.

In the diagram of the constitution shown in FIG. 2, in interface control part (I/F CONT) 233, access grant control part (Check Priority & Generate Grant) 233A is set, and it performs the following operation: it receives request signal RS from master I/Fs 21-0 through 21-3 via the interconnection bus; from said signal, the priority of master devices MS0-MS3 (not shown in the Figure, see FIG. 1) is checked; and, corresponding to the result of said checking, signal GS (to be referred to hereinafter as grant signal) that gives access grant is sent back to master I/Fs 21-0 through 21-3. This access grant control part 233A monitors the use condition of interface parts Ps-0, Ps-1, Ps-2. When the assigned interface parts Ps-0 through Ps-2 are in use, grant signal GS for granting access is not output. On the other hand, when there is an unused interface part, the priority from input request signal RS is checked, and grant signal GS can be applied to master I/Fs 21-0 through 21-3 in descending order of priority.

Also, the constitution is such that data select signals DSS0, DSS1 and DSS2 can be output from interface control part 233 to three selectors 231-0, 231-1, 231-2, respectively. As a result, output of data signals D0-D3 output from master I/Fs 21-0 through 21-3 is controlled.

The interface control part 233 stores master I/F receiving request signal RS and the interface part allotted to said request signal RS corresponding to each other.

Because data signals D0-D3 are output from three interface parts Ps-0, Ps-1, Ps-2, in order to take the interface with high-speed slave device SV3, high-speed slave connection part 3 is set (see FIG. 1).

Figure 3:
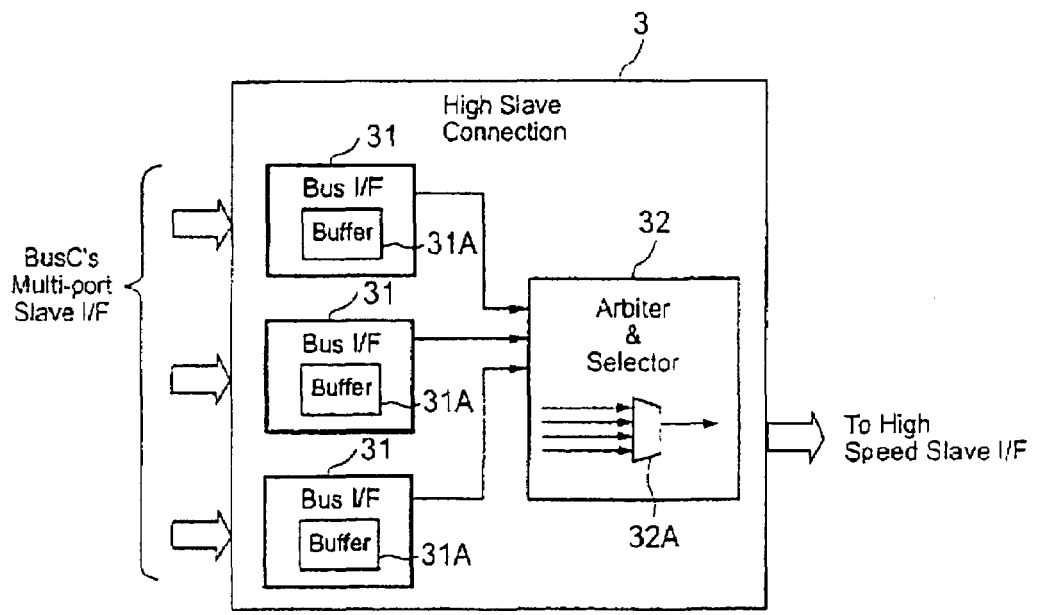
FIG. 3 is a block diagram illustrating the constitution of an example of the high-speed slave connecting part.

FIG. 3 is a diagram illustrating an example of constitution of high-speed slave connection part 3.

As shown in FIG. 3, high-speed slave connection part 3 has N (3 in this case) bus interface parts (bus I/F) 31 each having buffer 31A, and arbiter & selector 32 that has the outputs of bus interface part 31 input to it and arbitrates so that one output is selected at all times from the viewpoint of the time axis. The arbiter & selector 32 contains selector 32A, which is used to select the data signal.

Also, high-speed slave connection part 3 should have a clock change function. The clock change, for example, can be realized by means of a constitution in which three buffers 31A are changed with the input rate and output rate asynchronously.

In the following, an explanation will be presented regarding a specific operation example with reference to FIGS. 4 and 5. Here, six master devices and eight slave devices are set, and one of the slave devices is a memory as a high-speed slave device (high-speed RAM). In the example of operation to be explained below, while the data of the high-speed RAM are reloaded by means of a master device having a write host and read host function, the data are stored in the same RAM corresponding to the request from another master device.

Figure 4:
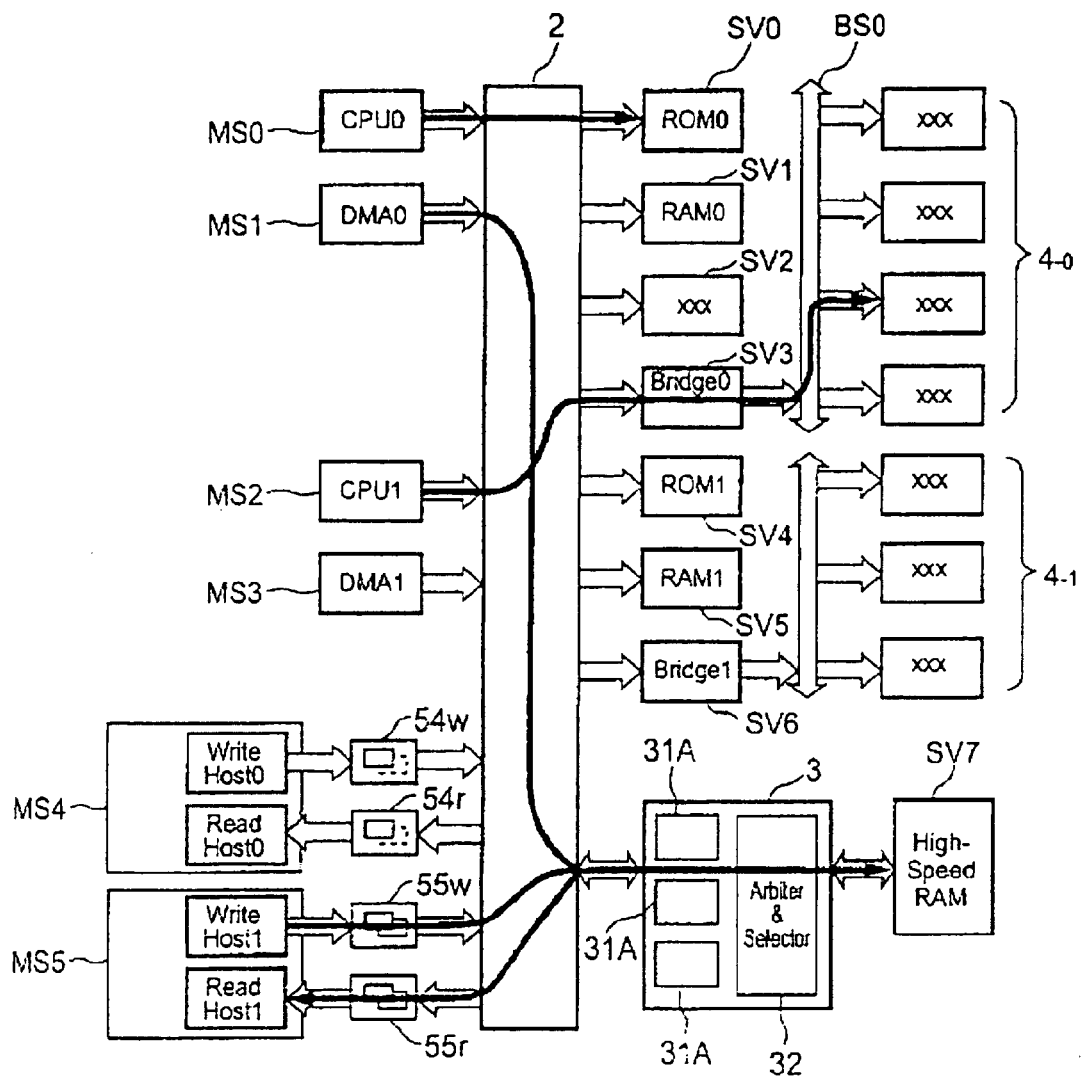
FIG. 4 is a block diagram illustrating an example of constitution of the overall system of the master devices and slave devices, as well as the signal flow.
Figure 5:
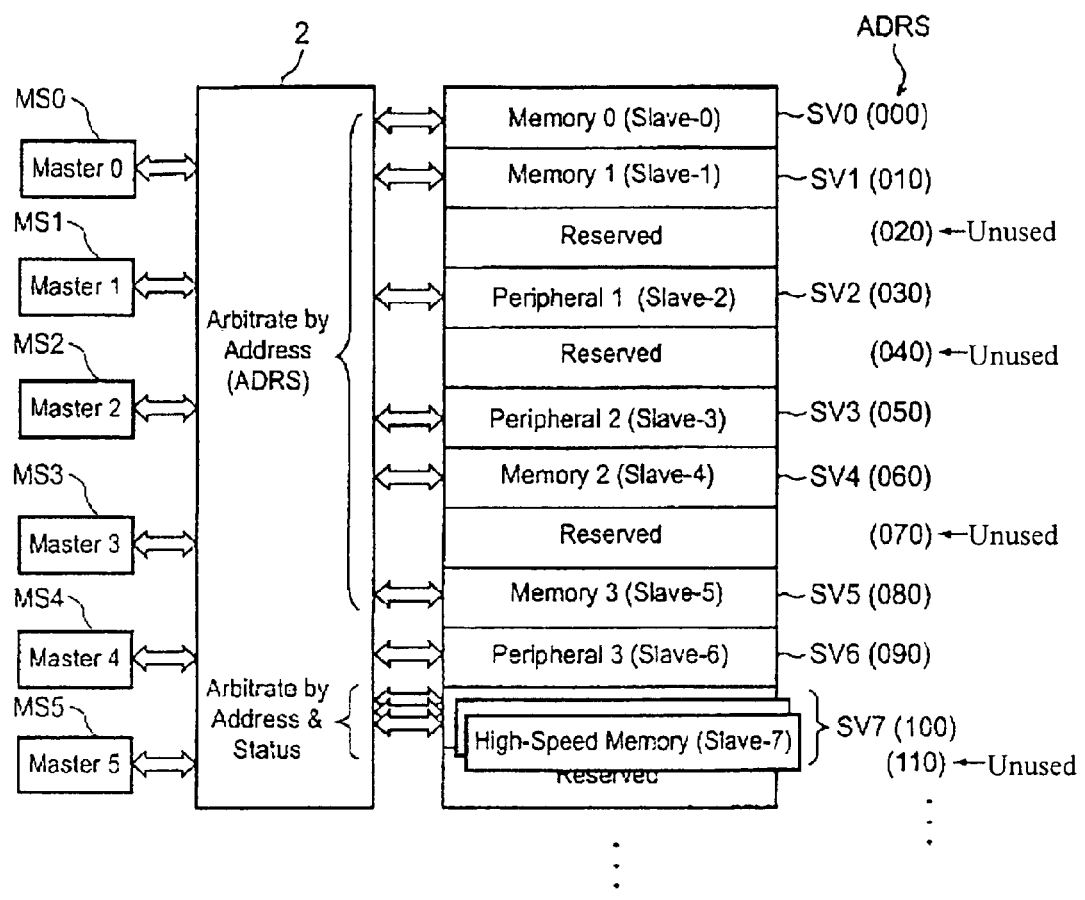
FIG. 5 is a diagram illustrating the allotment of addresses to the slave devices of the system.

Here, FIG. 4 is a block diagram illustrating an example of a constitution containing specific master devices and slave devices, and the signal flow. FIG. 5 is a diagram illustrating the allotment of addresses to the slave devices of the system.

As the six master devices shown in FIG. 4, CPU 0 (master device MS0), DMA 0 (master device MS1), CPU 1 (master device MS2), DMA 1 (master device MS3), data recording/reproduction device (master device MS4), and data recording/reproduction device (master device MS5) are connected to interconnection bus controller 2. Also, as the eight slave devices, ROM 0 (slave device SV0), RAM 0 (slave device SV1), peripheral device "xxx" (slave device SV2), bus bridge device (bridge 0) (slave device SV3), ROM 1 (slave device SV4), RAM 1 (slave device SV5), bus bridge device (bridge 1) (slave device SV6), and high-speed RAM (slave device SV7) are connected to interconnection bus controller 2.

Here, the two set bus bridge devices (slave devices SV3 and SV6) are controllers for connecting buses BS0 and BS1, which have different specifications from those of interconnection bus BS in interconnection bus controller 2, to said interconnection bus BS. Several peripheral devices 4-0 are connected via bus BS0 with different specifications to slave device SV3, and several peripheral devices 4-1 are connected via bus BS1 with different specifications to slave device SV5. Also, interconnection bus BS and bus BS0 or BS1 can work at different clock signals.

Also, as explained above, a high-speed RAM as high-speed slave device SV7 is connected via slave connecting part 3 (see FIG. 3) to interconnection bus controller 2. In order to perform data input/output in a seamless way, write host functional part (Write Host 1) and read host functional part (Read Host 1) of high-speed master device MS5 that transfers data with respect to said high-speed slave device SV7 are connected via a so-called ping-pong buffer 55w or 55r. Each the ping-pong buffer 55w, 55r has two internal buffers, and data that are successively input while access is made via the interconnection bus with the data staying in one of the two internal buffers can be stored in the other buffer. By alternating the operation, seamless data input/output can be performed. On the other hand, master device MS4 as another data recording/reproduction device may have a relatively low data rewrite speed, so its write host functional part (Write Host 0) and read host functional part (Read Host 0) are connected to interconnection bus controller 2 via conventional buffer 54w or 54r without the ping-pong structure.

The access object is assigned by means of the intrinsic addresses (ADRS) allotted to said six master devices MS0-MS5 and eight slave devices SV0-SV7, respectively. In this example, for example, as shown in FIG. 5, it is possible to adopt a structure in which the least significant place of the address (ADRS) is used for multi-access, while the remaining places are used for identifying the slave device. In the example shown in FIG. 5, because two places are set as the other places intrinsic to the slave device, it is possible to add up to 100 slave devices here. As shown in FIG. 5, address "000" is allotted to memory 0 (ROM 0: slave device SV0), address "010" is allotted to memory 1 (RAM 0: slave device SV1), address "030" is allotted to peripheral device 1 (xxx: slave device SV2), address "050" is allotted to peripheral device 2 (bridge 0: slave device SV3), address "060" is allotted to memory 2 (ROM 1: slave device SV4), address "080" is allotted to memory 3 (RAM 1: slave device SV5), and address "090" is allotted to peripheral device 3 (bridge 1: slave device SV6).

Apparently, simultaneous access from three master devices to the high-speed RAM (slave device SV7) is possible. However, only one address, "100", is allotted. For only the high-speed RAM corresponding to said multi-access, data input/output is arbitrated based on the status (use condition (see FIG. 2) or status). That is, for example, in the case of data input, if access identified by the address is granted, the input data are sent to an interface part judged to be unused from the status, and, after conversion by inputting to the high-speed interface (slave connection part 3), they are input to the high-speed RAM. On the other hand, for all the other slave devices, data input/output is arbitrated based on only all of the addresses. Also, in FIG. 5, the other addresses "020", "040", "070", "110," . . . are not used.

In the following, an explanation will be presented regarding the operation of the system with said constitution with reference to FIGS. 2 and 4. In FIG. 2, in order to simplify the Figure, only four master devices are shown. However, the explanation will be for a case where there are six master devices MS0-MS5 and six master I/Fs corresponding to them.

Initially, master devices MS0-MS5 send the addresses (ADRS) that specify the slave devices for sending data to corresponding master I/Fs 21-0, 21-1, 21-2, 21-3 (and 21-4, 21-5 that are not shown in the Figure). By decoding the addresses sent from the corresponding master devices, master I/Fs 21-0 through 21-5 output the access request (request signal RS) to one slave I/F. The request signal RS is transmitted via interconnection bus BS to the respective slave I/F.

When several request signals are received from the master I/Fs, slave I/Fs 22-0 through 22-4 that do not have a function corresponding to a multiport, a master I/F is specified according to the priority order allotted to the master device, and grant signal GS is sent to said master I/F. As a result, in the case of FIG. 4, access of master device MS0 (CPU 0) to slave device SV0 is granted, and grant signal GS is returned. Also, access of master device MS2 (CPU 1) to slave device SV3 (bridge 0) is granted, and grant signal GS is returned.

On the other hand, multiport slave I/F 23 shown in FIG. 2 corresponding to slave device SV7 with multi-access function (high-speed RAM) allows granting of up to three accesses. That is, the use condition of three interface parts Ps-0, Ps-1, Ps-2 is investigated, and, if all of them are idle, grant signal GS that gives access grant to the three master I/Fs that send out the access request is sent back. In this case, granting the use of idle interface parts is issued in descending order of priority of the master devices. In the example shown in FIG. 4, write host 1 and read host 1 of master device MS5 as a high-speed data storage/reproduction device have the highest priority. Consequently, if there is an idle interface part, the access grant is sent only to master device MS5. If there are two idle interface parts, as shown in FIG. 4, the access grant is also sent to, e.g., master device MS1 (DMA0) that has sent out an access request. Multiport slave I/F receives a request signal in the way same as a conventional slave I/F, and, in the grant signal with respect to a master I/F, the master I/F outputs a grant signal that can specify each interface part, and interface control part 233 stores the connection relationship with respect to master I/F and an interface part.

When grant signal GS comes from a slave I/F that requests access, master I/Fs 21-0 through 21-5 output a standby signal to connected master devices MS0-MS5. When grant signal GS is received from a slave I/F that requests access, master I/Fs 21-0 through 21-5 output said grant signal GS to master devices MS0-MS5. After receiving the grant signal, said master devices MS0-MS5 send the prescribed signals to interconnection bus controller 2 via master I/Fs 21-0 through 21-5.

In the case of FIG. 4, although an access request is output, master devices MS3 and MS4 have low priority, and the grant signal is not received, so data output is not performed. Because master devices MS1 and MS5 receive grant signal GS, data output to high-speed RAM (slave device SV7) is allowed. Also, because master device MS5 simultaneously receives grant signal GS of read grant of the data, it is also possible to read data in high-speed RAM.

In this case, when access to the master device is granted, slave I/Fs 22-0 through 22-6 that do not have a multiport function use selector 221 contained in them to select one data signal from the granted master device from the several data signals that have been sent in, and to output it to the slave device.

On the other hand, in slave I/F 23 with a multiport function, for example, as shown in FIG. 2, corresponding to input data select signals DSS0-DSS2, three selectors 231-0, 231-1, 231-2 corresponding to parts, such as selector 231-0 corresponding to interface part Ps-0, select the output data from the high-speed recording/reproduction device (slave device SV5), and the output data from DMA0 (slave device SV1) is selected by means of selector 231-2 corresponding to interface part Ps-2.

In the aforementioned example, only interface parts Ps_0, Ps_2 are used. However, one may also adopt the following scheme: interface part Ps_1 is also used at the same time, so that the ability of a high-speed RAM having a data rewrite speed about three times that of the other slave devices is fully used, and high-speed seamless data transfer is possible to the high-speed data recording/reproduction device (slave device SV5) that requires real time operation.

FIG. 1 is a diagram illustrating in detail an example of the constitution of interconnection bus BS. As far as the basic operation is concerned, because it is the same as that explained with reference to FIGS. 2-5, in the following, an explanation will be presented regarding mainly the constitution (connection relationship) and the signal flow.

Figure 6:
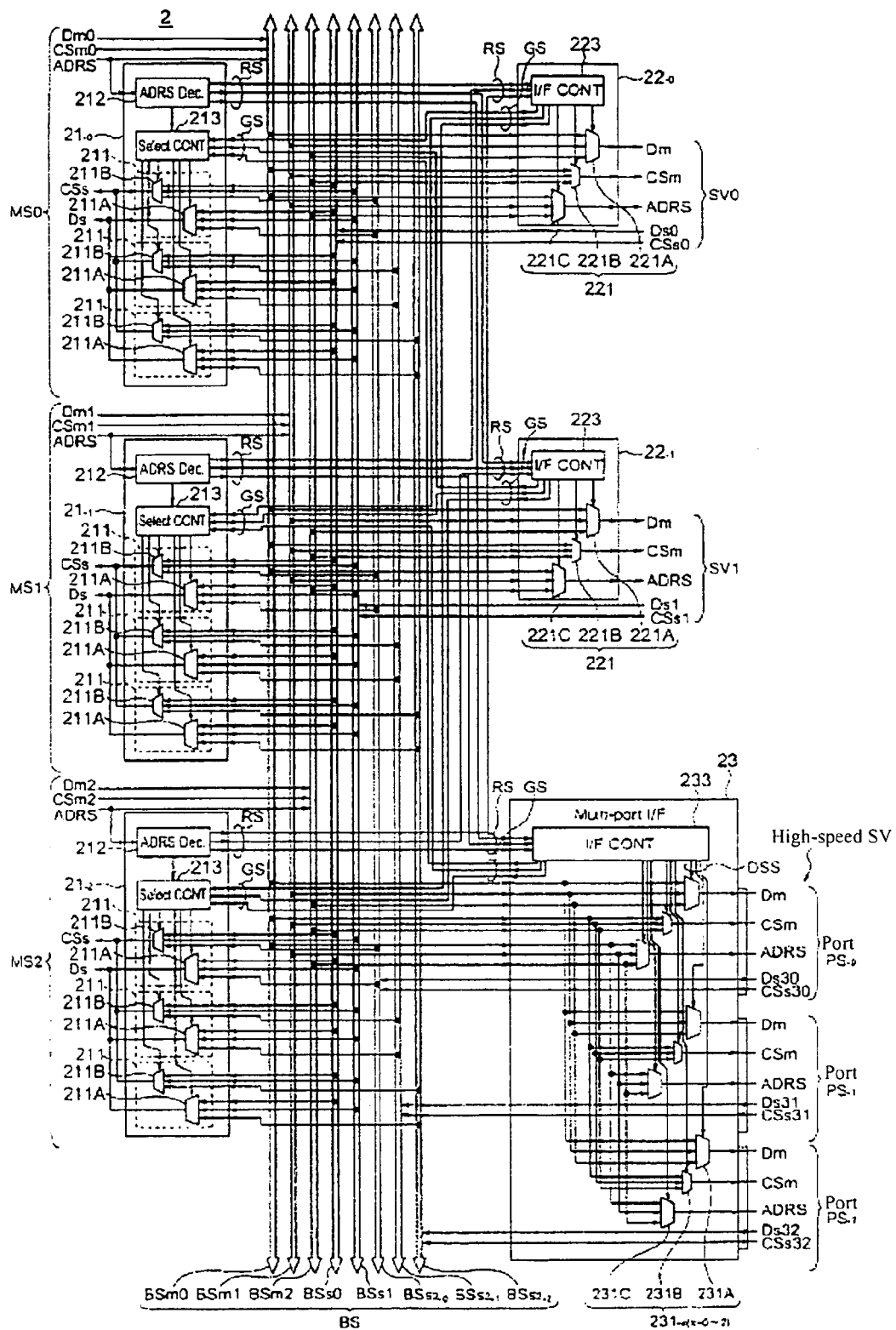
FIG. 6 is a circuit diagram illustrating in detail the interconnection bus, as well as its connection relationship with the master I/Fs and slave I/Fs.

FIG. 6 is a circuit diagram illustrating the detailed constitution of interconnection bus BS and its connection relationship with master I/Fs and slave I/Fs.

Here, control signal CS and address signal (ADRS) other than access request signal RS and grant signal GS are transferred by means of master devices and slave devices. Three selectors 211 set in each of master I/Fs 21-0 through 21-2 are composed of selector 211A for data and selector 211B for control signal.

Also, in slave I/Fs 22-0 and 22-1 without a multi-access function, selector 221 is composed of selector 221A for data, selector 221B for control signal, and selector 221C for address. Also, in multiport slave I/F 23 corresponding to multi-access, the selectors include selector 231A for data, selector 231B for control signal, and selector 231C for address. In particular, in multiport slave I/F 23, said selector 231A for data, selector 231B for control signal, and selector 231C for address are set as three groups corresponding to interface parts Ps-0~Ps-2. Said group of three selectors corresponds to one of selectors 231-0, 231-1, and 231-2 shown in FIG. 1. The use condition of the interface parts is given as control signal CS. Because multiport slave I/F 23 can work as three slave I/Fs apparently, for the interconnection bus BS, the constitution is such that it is possible to obtain three independent outputs of address, control signal, and data.

For the interconnection bus BS, in order to perform bidirectional data transfer, each data transfer direction has an independent bus constitution. Consequently, in the example of the circuit shown in FIG. 6, interconnection bus BS is composed of as many master side buses BSm0, BSm1, and BSm2 as the sum of the master I/Fs, and as many slave side buses BSs0, BSs1, BSs2_1, BSs2_1, and BSs2_2 as the sum of the interface parts in the slave I/Fs and the multiport slave I/F.

Each the master I/F 21-0 through 21-2 decodes the input address signal (ADRS), and, based on the decoding result, it generates request signal RS and outputs it. It has selection control part (Select CONT) 213 that controls selectors 211A and 211B based on obtained address decoder (ADRS Dec) 212, the address decode result, and input grant signal GS.

Master data Dm0, master control signal CSm0, and address signal (ADRS) input from master device MS0 are input to master side bus BSm0. Similarly, master data Dm1, master control signal CSm1, and address signal (ADRS) input from master device MS1 are input to master side bus BSm1, and master data Dm2, master control signal CSm2, and address signal (ADRS) input from master device MS2 are input to master side bus BSm2.

Master data Dm0-Dm2 output to master side buses BSm0-BSm2 are input to selector 221A in slave I/Fs 22-0, 22-1 or the three selectors 231A in multiport slave I/F 23, and, under said control, appropriate selection is made for output. Also, master control signals CSm0-CSm2 output to master side buses BSm0-BSm2 are input to selector 221B in slave I/Fs 22-0, 22-1 or the three selectors 231B in multiport slave I/F 23, and, under said control, appropriate selection is made for output. Similarly, address signals (ADRS) output to master side buses BSm0-BSm2 are input to selector 221C in slave I/Fs 22-0, 22-1 or the three selectors 231C in multiport slave I/F 23, and, under said control, appropriate selection is made for output.

On the other hand, slave data Ds0 and slave control signal CSs0 input from slave device SV0 are input to slave side bus BSs0. Similarly, slave data Ds1 and slave control signal CSs1 input from slave device SV1 are input to slave side bus BSs1. High-speed slave data Ds30-Ds32 input from the high-speed slave via various interface parts Ps-0, Ps-1, and Ps-2 are input to slave side buses BSs2_0, BSs2_1, BSs2_2, respectively. Similarly, high-speed slave control signals CSs30-CSs32 input from the high-speed slave via various interface parts Ps-0, Ps-1, and Ps-2 are input to slave side buses BSs2_0, BSs2_1, BSs2_2, respectively.

Slave data Ds0, Ds1 and Ds3x (x=0~2) output to slave side buses BSs0-BSs2_x are input to selector 211A in master I/Fs 21-0 through 21-2, and, under said control, they are appropriately selected and output. Also, slave control signals CSs0, CSs1 and CSsx (x=1-2) output to slave side buses BSs0-BSs2_x are input to selector 211B in master I/Fs 21-0 through 21-2, and, under said control, they are appropriately selected and output.

In the aforementioned bus constitution, the selector that performs bus output control receives request signal RS, selects the signal on the master side that outputs grant signal GS, and outputs it to the slave device side by means of interface control part 223 or 233 on slave I/F side. In particular, in multiport slave I/F 23, its interface control part 233 can simultaneously output plural master data, etc., by means of control in parallel selectors (231-x) (x=0-2) corresponding to three interface parts Ps-0 through Ps-2. For such master data, etc., timing adjustment is performed by means of said slave connecting part 3, and the data transfer speed is increased by means of clock change, so that they become a single high-speed signal for input to the high-speed slave device. Also, by means of slave connecting part 3, signals from the high-speed slave device are converted reversely by time division to three paths so that they become low speed slave signals that are output to slave side buses BSs2_0, BSs2_1, BSs2_2 of interconnection bus BS from the interface part. Then, the slave signals (slave data signal and slave control signal) are under output control by selection control part 213 on the side of the master data master I/F. That is, address decoder 212 outputs request signal RS, and only the output of the slave I/F with grant signal GS returned is selected and output to the master device side.

In the following, an explanation will be presented regarding an example of a system in which high-speed data and low-speed data are mixed.

Figures 7, 8:
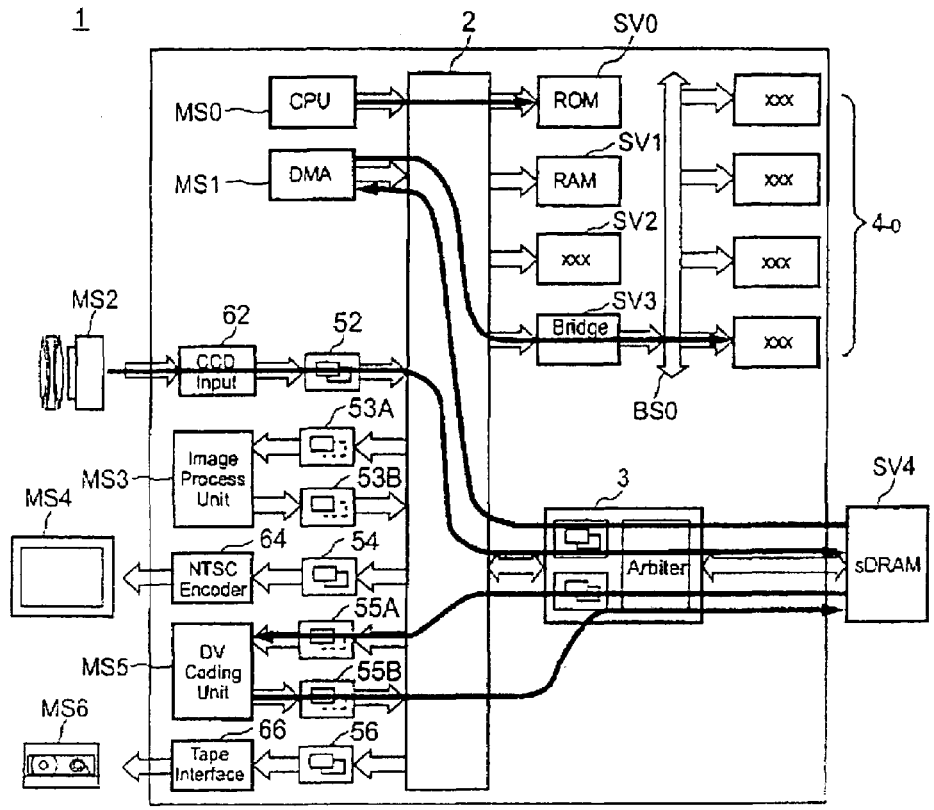
FIG. 7 is a block diagram illustrating the constitution and signal flow of a DVC recorder as an example of the system.
FIG. 8 is a table showing the clock rate, data width and transfer rate for each of the input/output paths of data in the DVC recorder shown in FIG. 7.

FIG. 7 is a block diagram illustrating a DVC (digital videocassette) recorder as a system example. In the case of the DVC recorder, in addition to master devices MS0 (CPU) and MS1 (DMA) of the control system, as the master devices of the image pickup, data processing and recording system, the following parts are also connected: CCD camera unit MS2, image processing unit MS3 that processes the image data picked up by the CCD camera, monitor MS4 that displays the image data, DV decoding unit MS5 that converts the image data to DV format, and DVC recording unit MS6 that records the DV formatted data on a tape. Among these, CCD camera unit MS2, monitor MS4 and DVC recording unit MS6 require real time operation for data input/output, and ping-pong buffers 52, 54 and 56 are connected to these data paths. On the other hand, conventional buffers 53A, 53B, 55A and 55B are connected to the data input/output paths of image processor unit MS3 and the DV coding unit MS5 that allow somewhat slower data transfer. In addition, CCD input processor 62 of the image signal fetched from the CCD is connected between CCD camera unit MS2 and ping-pong buffer 52; NTSC encoder 64 is connected between monitor MS4 and ping-pong buffer 54; and tape interface 66 is connected between DVC recording unit MS6 and ping-pong buffer 56.

As slave devices, the memory and peripheral devices SV0-SV3 of the control system are connected; and, as the high-speed memory, sDRAM SV4 is connected. Peripheral device SV3 is a bus bridge device connected via another bus SB0 to several slave devices "xxx"4-0. sDRAM SV4 is connected via slave connecting part 3.

As shown in FIG. 8, in each data input/output path, the clock rate (MHz), data width (Bytes), transfer rate (MB/S (megabytes/sec), Mb/s (megabits/sec)) are summarized and listed.

The CCD input with a clock rate of 30 MHz, data width of 2 bytes, and transfer rate of 60 MB/s requires real time operation, and has the highest priority. Also, the NTSC monitor output with a clock rate of 13.5 MHz, data width of 2 bytes and transfer rate of 27 MB/s also requires real time operation, and it has the next highest priority. For the priority order, output to the tape recording part is next higher, and, for data input/output to the DV format conversion unit and image processing unit, the highest priority is lowered in this Japanese character. For example, assuming that the interconnection bus has a transfer speed of 60 MB/s (30 MHz×2 bytes), and the sDRAM has a transfer rate of 216 MB/s, by setting four interconnection parts in the multiport slave I/F, it is possible to realize high-speed data transfer.

For the bus controller in this embodiment and the system using it, there are the following advantages.

Because there is multiport slave I/F 23, in the slave devices connected to said multiport slave I/F 23, even if simultaneous access is made from different master devices, it is still possible to output the data from the different master devices through plural interface parts to the slave device side. As a result, the bus controller with the interconnection constitution allows changing the specifications corresponding to the multi-access function, and a memory connection that allows high-speed transfer is possible. That is, if there is a block that requires real time operation in the interconnection bus constitution (CCD input, NTSC output, etc.), in the prior art, it would be necessary to set a separate high-speed bus because it is difficult to guarantee real time operation. On the other hand, in the present embodiment, it is possible for all of the contained blocks having different data transfer speeds to be the masters and slaves in a single interconnection bus interface. In this case, the blocks can be freely connected within the range required on the block number and system specifications and independent of the type, that is, either memory or CPU.

As explained above, the system using the interconnection bus is simpler, and it is possible to cut the material and design costs.

Also, when a slave device is newly added, it is only necessary to allot an unused address to the slave device, and the corresponding slave device is connected to the unused (or newly set) slave I/F. Consequently, in the system using the interconnection bus, it is easy to change the system constitution without change in the bus constitution. This is an advantage. The same advantage takes place when a master device is added.

However, in a large system, when evaluation is difficult by simulation alone, evaluation may be performed with functioning of the breadboard, etc.

Figure 9:
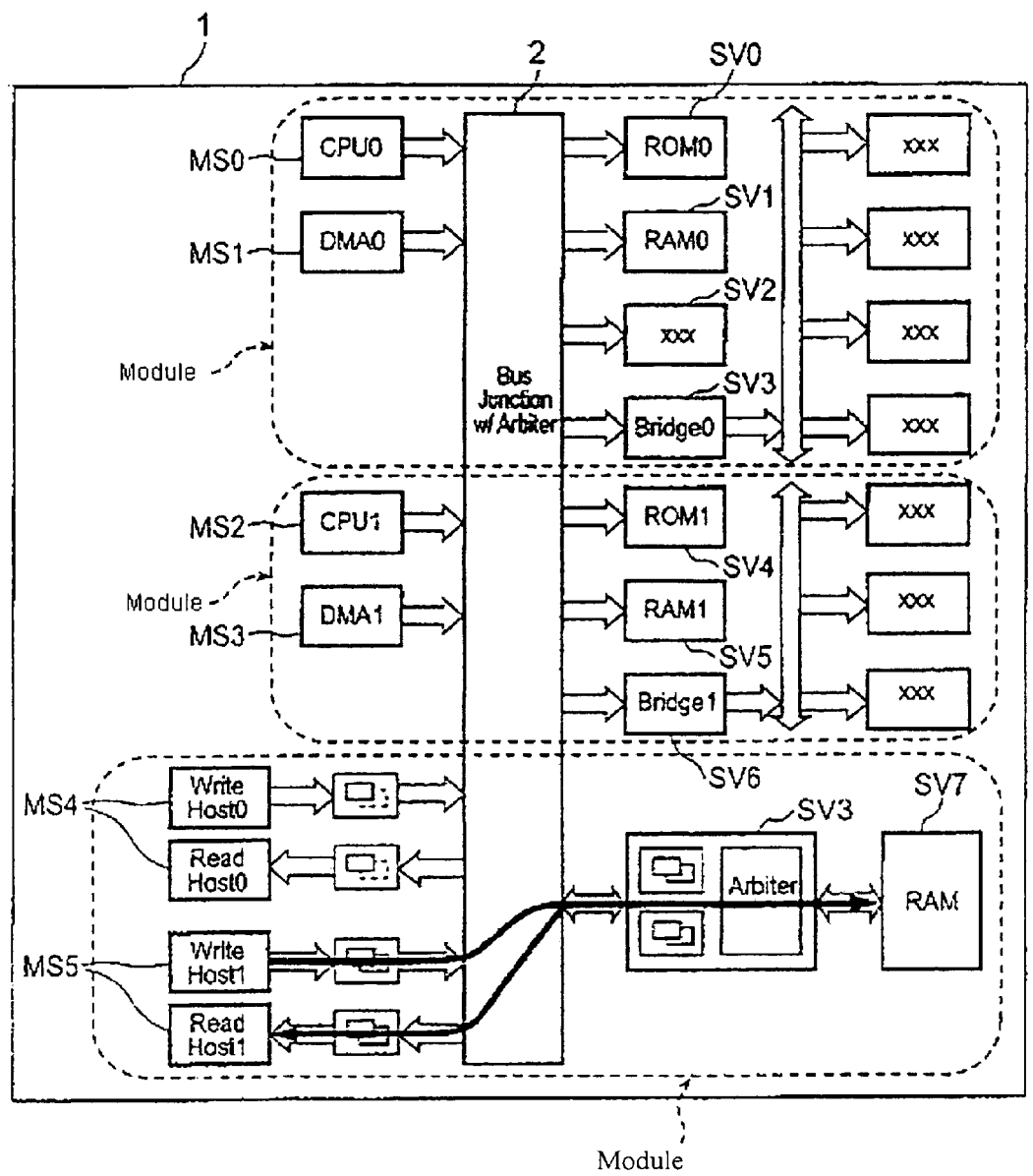
FIG. 9 is a block diagram illustrating a system including modules A-C as the evaluation and development units.
Figure 10:
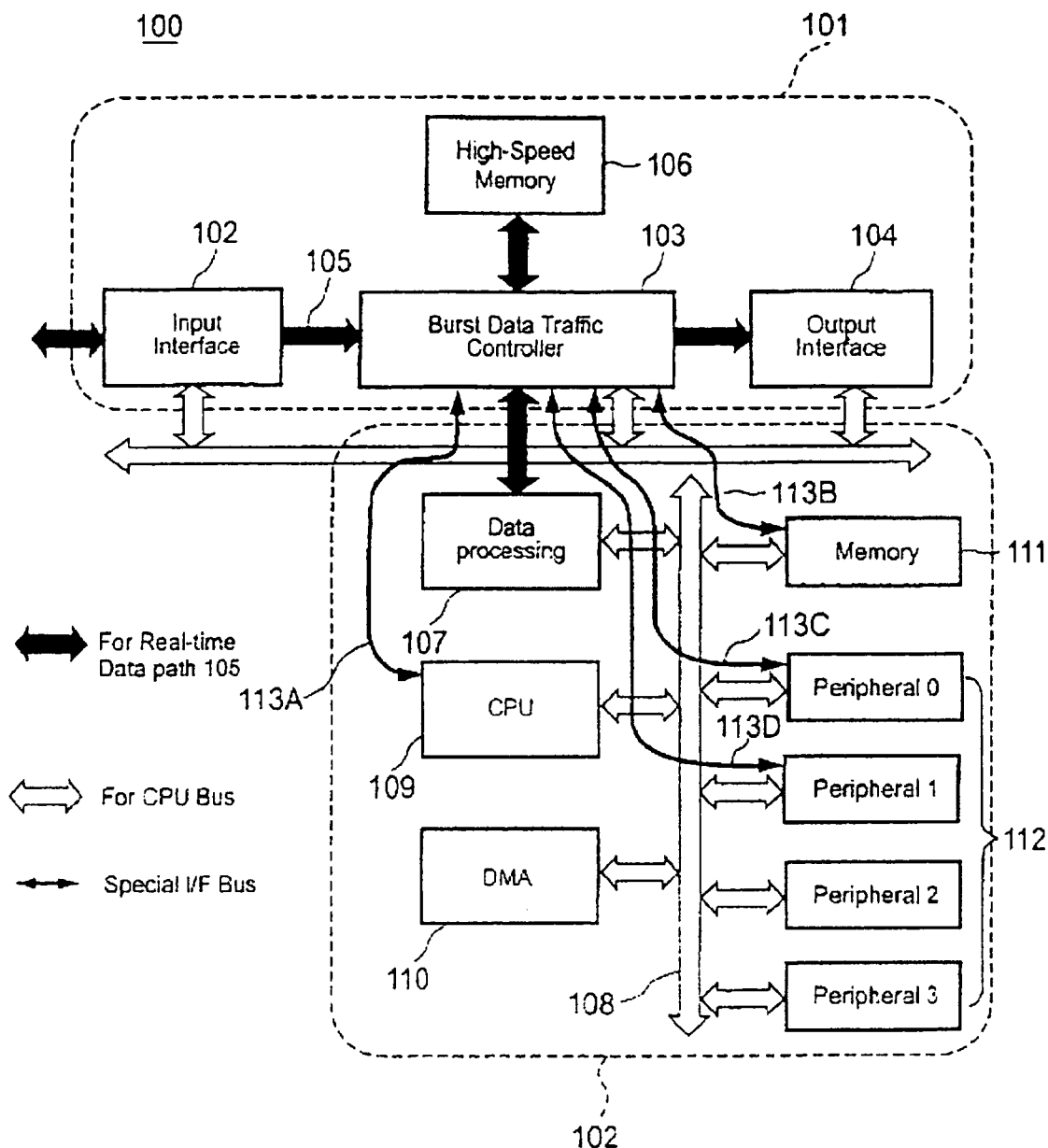
FIG. 10 is a block diagram illustrating a system that adopts the first bus constitution of the prior art in a system that requires real time operation of data input/output.
Figure 11:
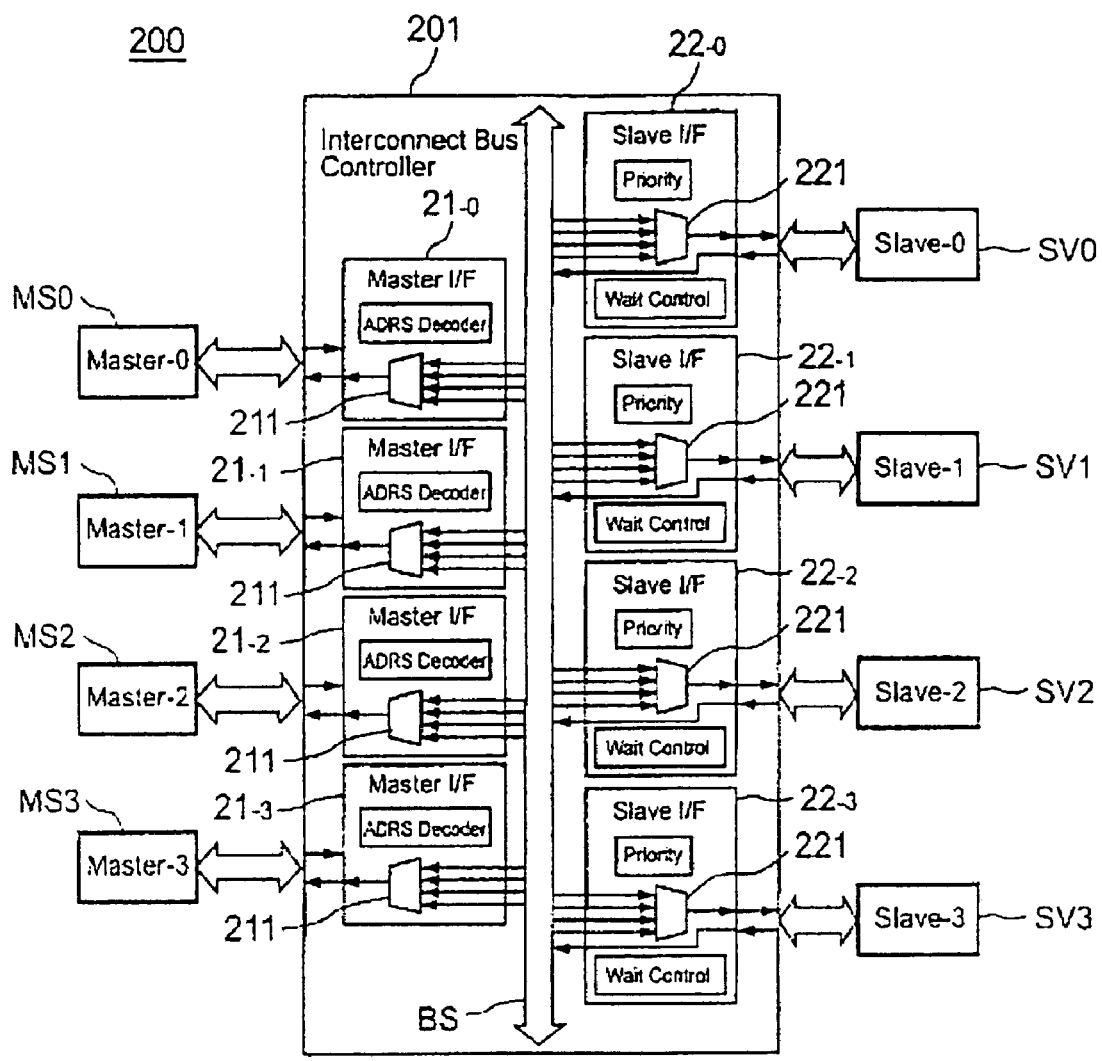
FIG. 11 is a schematic diagram illustrating a system that adopts the second bus constitution (mutual connection bus constitution) adopted in the prior art.

For example, for the system shown in FIG. 9, in the units of module A, module B, and module C, the functions are divided and evaluated. If good evaluation results are obtained, they may be unified for evaluation. In this case, the master devices and slave devices of all the blocks are connected to one interconnection bus controller 2. Consequently, it is easy to match the evaluation between blocks, and it is easy to determine the influence of change in design of one module on the others. Also, it is easy to divide or unify the modules without a decrease in the system ability.

For reasons related to development and the roadmap of final products (planned development and product declaration), etc., plural chips are developed, and they may be integrated into a single chip later. In this case, by means of the interconnection bus controller in the present embodiment, a new definition of the bus interface (master I/F or slave I/F) or a change in each module (portion divided into plural chips) is not necessary. In this case, items to be checked include matching between the modules. One may put emphasis on evaluation of this point, and make only necessary changes according to the evaluation result, and plural chips can be easily unified into a single one. That is, according to the present embodiment, the following operation can be performed easily: the constitution of the final product is divided into plural groups, each having a master device and slave device, and each group is developed as a device, followed by integrating the functions of the plural devices into a single future chip. This is an advantage.

In addition, there is the following advantage: even if the devices are not integrated into a single chip, one may design and develop plural systems having the same or a similar major function parallel to each other or sequentially in time. As a result, one module may be reused in a different system. Consequently, the development efficiency can be increased, and the resources for development can be reduced.

The invention claimed is:

1. A bus controller, comprising:
a first predetermined number of master interfaces each allowing connection of a master device;
a second predetermined number of slave interfaces each allowing connection of a slave device;
a bus that connects said master interfaces and slave interfaces; and
a multiport slave interface adapted to simultaneously select up to said first predetermined number of master devices for transfer of signals therefrom and to output up to said first predetermined number of signals to a slave device by way of said first predetermined number of said interface paths, wherein said multiport slave interface has N interface parts set between the bus side and slave device side, and is adapted to allow simultaneous access from up to N master devices.

2. The bus controller described in claim 1, wherein said bus controller has a slave connecting part, which is set between said N interface parts and the slave device, which divides the signal from said slave device into N signals that are output to said N interface parts, and which merges the N signals input from said N interface parts to a single signal for output to said slave device, and converts the transfer speed of said bus and the transfer speed of said slave device.

3. The bus controller described in claim 1, wherein the plural addresses are allotted to the slave device connected to said slave interface corresponding to the multi-access, only one address is allotted to each of the other slave devices, and said multiport slaves interface uses the allotted plural addresses to control signal input/output corresponding to the priority order of the master devices that request access.

4. The bus controller described in claim 3, wherein said slave interface has N selectors that select and output one of the input signals when said plural signals are input from any master interfaces via said bus, and an interface control part that controls corresponding to the addresses for input of said N connectors.

5. The bus controller described in claim 4, wherein said interface control part performs the following operation: when there is an access request, if there are unused interface parts of said slave interface corresponding to multi-access, an access grant signal is output to the side of the master device that sent the access request, and the signal from the master device sent corresponding to said grant signal is selected and output by means of selection of said N selectors.

6. The bus controller described in claim 5, wherein the interface control part is further adapted to, when the access request number is larger than the number of said unused interface parts, output access grant signals corresponding to the priority order of the master devices requesting access.

* * * * *